United States Patent [19]
Kopecky et al.

[11] Patent Number: 5,510,124
[45] Date of Patent: Apr. 23, 1996

[54] METHOD FOR PACKAGING SINGLE UNITS OF CHEWING GUM AND CHEWING GUM SO PACKAGED

[75] Inventors: Stanley J. Kopecky, Prospect Heights; Daniela Zaluda, Chicago; Christafor E. Sundstrom, Glen Ellyn; Steven E. Zibell, Tinley Park; William T. Boyd, Aurora, all of Ill.

[73] Assignee: Wm. Wrigley Jr. Company, Chicago, Ill.

[21] Appl. No.: 216,811

[22] Filed: Mar. 23, 1994

[51] Int. Cl.$^6$ .................................. B65D 65/02
[52] U.S. Cl. .................. 426/5; 426/106; 426/125; 426/410; 426/415; 53/455; 53/466
[58] Field of Search ................... 426/5, 3, 125, 426/108, 106, 410, 415; 53/455, 466, 472

[56] References Cited

U.S. PATENT DOCUMENTS

| | | | |
|---|---|---|---|
| 1,216,259 | 2/1917 | Armstrong | 426/108 X |
| 1,869,584 | 8/1932 | Reymond | 53/461 |
| 2,140,748 | 12/1938 | Johanson | 229/87.01 |
| 2,192,472 | 3/1940 | Huston | 426/108 |
| 2,210,195 | 8/1940 | Baldwin | 426/108 X |
| 2,449,334 | 9/1948 | Smith | 53/461 |
| 3,632,424 | 6/1972 | Graham et al. | 428/342 |
| 3,671,479 | 6/1972 | Ottinger et al. | 524/521 |
| 4,070,851 | 1/1978 | Schoppee | 53/228 |
| 4,150,161 | 4/1979 | Rudolph et al. | 426/5 X |
| 4,514,422 | 4/1985 | Yong et al. | 426/3 |
| 4,526,790 | 7/1985 | Somola | 426/5 |
| 4,666,079 | 5/1987 | Bolli et al. | 229/87.08 |
| 4,842,870 | 6/1989 | Dokuzovic et al. | 426/5 X |
| 4,881,646 | 11/1989 | Weber | 229/87.08 |
| 4,993,213 | 2/1991 | Kobler et al. | 53/446 X |
| 5,048,260 | 9/1991 | Raymond et al. | 53/370.8 |
| 5,215,249 | 6/1993 | Gorrieri | 229/87.05 |
| 5,376,388 | 12/1994 | Meyer | 426/5 |

Primary Examiner—Donald E. Czaja
Assistant Examiner—Milton I. Cano
Attorney, Agent, or Firm—Hill, Steadman & Simpson

[57] ABSTRACT

A method for providing single units of sugarless chewing gum and compositions so packaged. Individual pieces of chewing gum are provided which units will have a sufficiently long shelf life in order to allow the units to be sold and carried by a consumer even in environments that are detrimental to the stability of chewing gum, e.g., high temperature and humidity. To this end, a piece of chewing gum is provided that is substantially sugar free and that is surrounded by a wrapper, with at least a first portion of the wrapper being sealed to a second portion of the wrapper to create a sealed environment that houses the piece of chewing gum. The wrapper has a moisture vapor permeation rate of less than 0.10 g/100 in$^2$/24 hr at 100° F., 90% RH as measured by ASTM method F1249-90. In an embodiment, the wrapper has an oxygen permeability that is less than 0.10 cc/100 in$^2$/24 hr at 1 ATM as measured by ASTM method D3985-81.

24 Claims, 2 Drawing Sheets

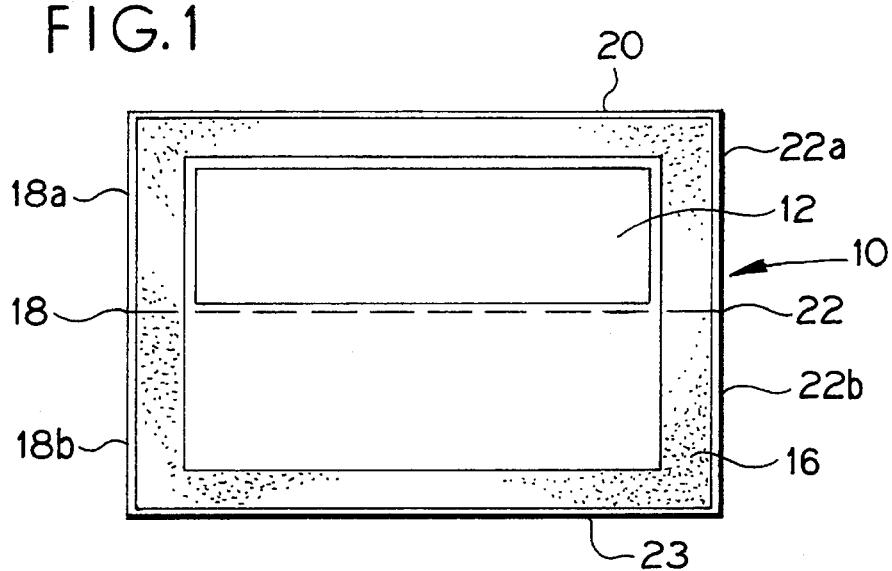
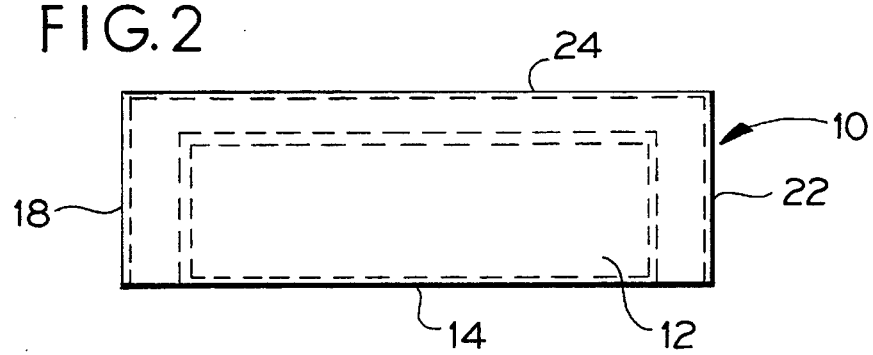
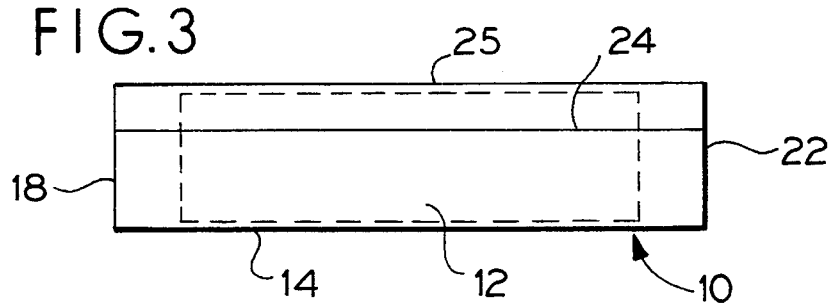
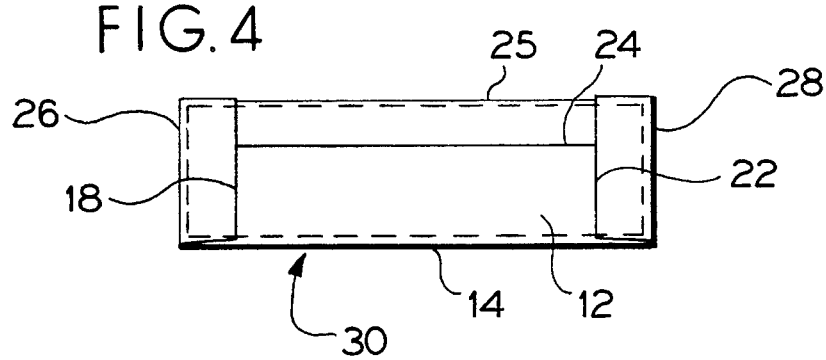

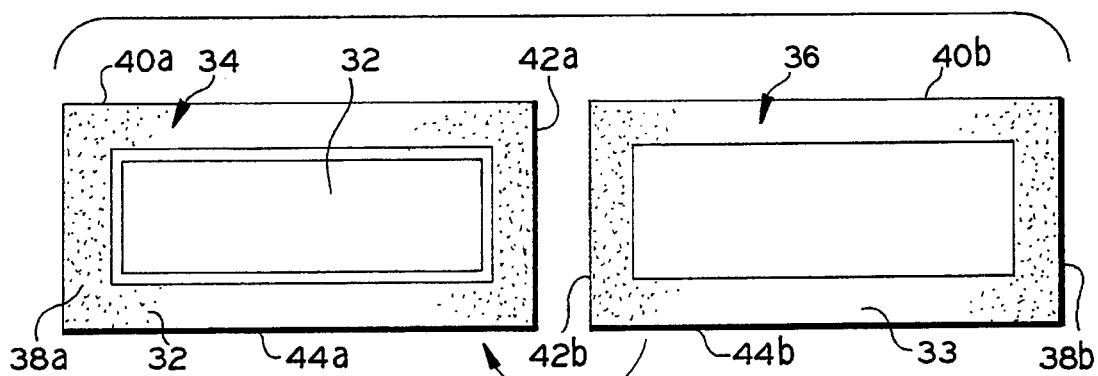
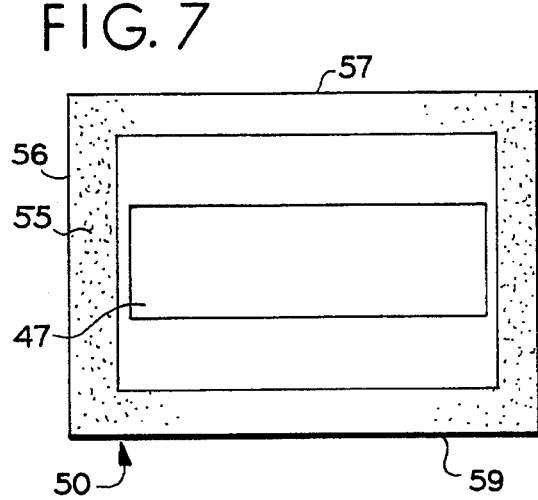
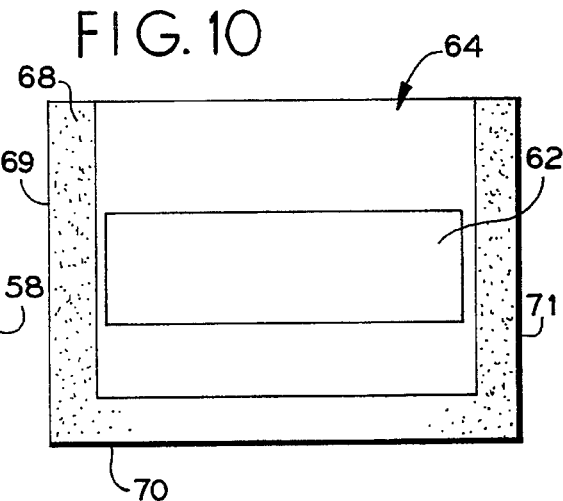
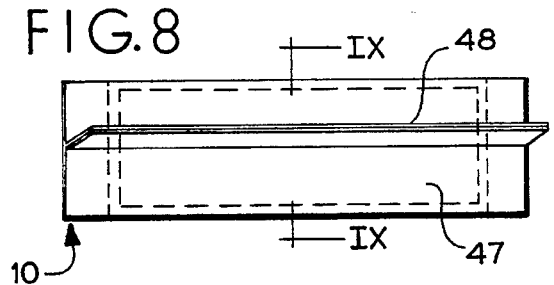
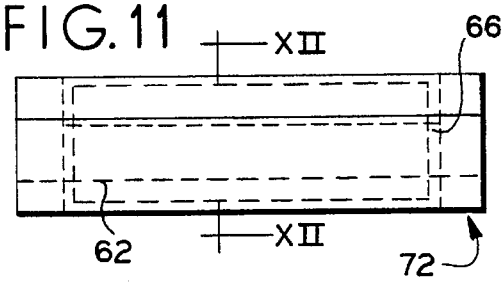
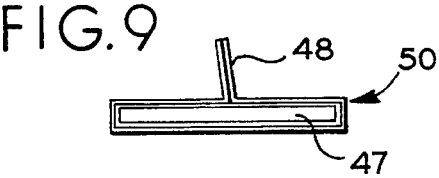
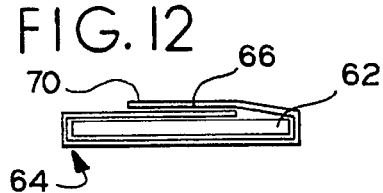

METHOD FOR PACKAGING SINGLE UNITS OF CHEWING GUM AND CHEWING GUM SO PACKAGED

BACKGROUND OF THE INVENTION

The present invention generally relates to chewing gum. More specifically, the present invention relates to methods of packaging chewing gum in individual units.

Chewing gum, during storage or exposure to ambient conditions, has a tendency to lose or gain moisture from the surrounding atmosphere depending on the ambient temperature, relative humidity, and the packaging used to house the chewing gum. Additionally, the formulation of the chewing gum can have a major effect on the tendency of the chewing gum to lose or gain moisture.

For example, sugarless chewing gum tends to be hygroscopic. In sugarless gums which are sweetened with aspartame or other moisture-susceptible artificial sweeteners, it is important to maintain a lower moisture content in order to prevent loss of sweetness and flavor qualities, as well as desired physical properties. However, due to their low initial moisture content and higher level of hygroscopic ingredients, these sugarless gums tend to gain moisture when the relative humidity is about 20% or greater, causing a wetness of the chewing gum and degregation of the aspartame or other moisture-susceptible ingredients.

Various techniques have been developed for the purpose of protecting chewing gum from moisture loss, moisture gain, and other adverse changes which result from storage. For example, packaging techniques have been developed for sealing and providing a protective packaging for chewing gum. One such technique is disclosed in U.S. Pat. No. 5,048,260 to Raymond et al. For example, it is known to generally package pieces of chewing gum in a wrapper that comprises a composite material having a tissue or paper substrate that defines an inner surface that contacts the chewing gum and a metal foil outer surface. The composite wrapper does not, in and of itself, provide sufficient barrier properties for long term storage of chewing gum because it is not typically sealed and is not otherwise a high barrier material. It is therefore necessary to house a group of individually wrapped gum pieces in, for example, a package more commonly referred to in the industry as a counterband. The counterband is usually also a composite material, such as, an inner layer of aluminum foil with a paper and/or polypropylene outer surface. The counterband seals the individually wrapped pieces of chewing gum until opened by the customer.

Although the composite wrapper and counterband provide sufficient barrier properties allowing long term storage of chewing gum, a number of issues are raised especially in certain regions and environments. In some markets, especially emerging markets, e.g., some third world nations, the price of multiple piece packages of gum, particularly sugarless chewing gum, are prohibitively expensive for many potential customers.

Additionally, in certain environments, after a multiple piece package, e.g. counterband, is opened, the unused pieces can rapidly deteriorate. This is especially a problem with sugarless chewing gums which tend to be hygroscopic. Moreover, multiple piece packages create excessive package waste because the individual pieces are also separately wrapped in a paper substrate or tissue as noted above.

There is therefore a need for improved packaging that allows single units to be packaged but still provides sufficient shelf life to chewing gum products, especially sugarless chewing gum pieces and particularly in environments having a high humidity and temperature.

SUMMARY OF THE INVENTION

The present invention provides a method for providing single units, e.g., pieces, of sugarless chewing gum and compositions so packaged. Pursuant to the present invention, individual pieces of chewing gum can be provided which units will have a sufficiently long shelf life in order to allow the units to be sold and carried by a consumer even in environments that are detrimental to the stability of chewing gum, e.g., high temperature and/or humidity.

To this end, the present invention provides a piece of chewing gum that is substantially sugar free and that is surrounded by a wrapper. At least a first portion of the wrapper is sealed to a second portion of the wrapper to create a sealed environment that houses the piece of chewing gum. The wrapper has a moisture vapor permeation rate of less than 0.10 g/100 in$^2$/24 hr at 100° F., 90% RH as measured by ASTM method F1249-90.

In an embodiment, the wrapper has an oxygen permeability that is less than 0.10 cc/100 in$^2$/24 hr at 1 ATM as measured by ASTM method D3985-81.

In an embodiment, the wrapper includes a substrate chosen from the group consisting of: paper; foil; polypropylene; polyethylene; nylon; cellophane; ethylenevinyl alcohol; and polyethylene terephthalate.

In an embodiment, the wrapper includes a substrate having a barrier layer that includes a material chosen from the group consisting of: aluminum; aluminum oxides; silicon dioxide; and polyvinyldichloride.

In an embodiment, the first portion of the wrapper is sealed to the second portion of the wrapper through a cold sealing process.

In an embodiment, the first portion of the wrapper is sealed to the second portion of the wrapper through a heat sealing process.

In an embodiment, the first portion of the wrapper is sealed to the second portion of the wrapper through use of an adhesive.

In an embodiment, the first portion of the wrapper is sealed to the second portion of the wrapper through an induction sealing process.

In another embodiment, an enclosed single piece of substantially sugar free chewing gum is provided. The enclosed single piece includes a piece of chewing gum that is substantially sugar free and a high barrier wrapper surrounding the piece of chewing gum. At least a first portion of the high barrier wrapper is sealed to a second portion of the high barrier wrapper. The high barrier wrapper is defined by a substrate including at least one barrier material selected from the group consisting of: paper; foil; polypropylene; polyethylene; nylon; cellophane; ethylenevinyl alcohol; and polyethylene; and a barrier layer of at least one material selected from the group consisting of aluminum; aluminum oxides; silicon dioxide; and polyvinyldichloride.

Additionally, the present invention provides a method for packaging a substantially sugar free piece of chewing gum. The method comprises the steps of: providing a wrapper having a vapor permeation rate of less than 0.10 g/100 in$^2$/24 hr at 100° F., 90% RH as measured by ASTM method F1249-90 and an oxygen permeability that is less than 0.01 cc/100 in$^2$/24 hr at 1 ATM as measured by ASTM method D3985-81; and sealing a substantially sugar free piece of chewing gum within the wrapper.

In an embodiment, portions of the wrapper are sealed to each other through a cold sealing process.

It is an advantage of the present invention to provide single units of sugarless chewing gum that have a sufficiently viable shelf life.

Another advantage of the present invention is to provide single units of chewing gum to allow consumers who cannot afford multiple piece packages of chewing gum to purchase sugarless chewing gum.

Still, an advantage of the present invention is to provide a method of packaging single units of chewing gum so that even in harsh environments, e.g., high temperature and humidity, the chewing gum still maintains a sufficiently long shelf life.

Furthermore, an advantage of the present invention is that it reduces package waste as compared to multiple piece packaged chewing gum products.

Moreover, an advantage of the present invention is that it provides an improved packaging for chewing gum.

Further, an advantage of the present invention is to provide a method for packaging a single piece of chewing gum using a cold sealing process.

Additional features and advantages of the present invention are described in, and will be apparent from, the detailed description of the presently preferred embodiments and from the drawings.

BRIEF DESCRIPTION OF THE DRAWINGS

FIG. 1 illustrates a perspective view of an embodiment of the present invention during a step of the process for packaging a single unit of chewing gum.

FIG. 2 illustrates a perspective view of a further step in the process for packaging the single unit of chewing gum.

FIG. 3 illustrates a perspective view of a further step in the process for packaging the single unit of chewing gum.

FIG. 4 illustrates a single unit of chewing gum packaged pursuant to an embodiment of the present invention.

FIG. 5 illustrates a perspective view of another embodiment of a step in the method of packaging a unit of chewing gum packaged pursuant to the present invention.

FIG. 6 illustrates a cross-sectional view of a unit of chewing gum packaged pursuant to the method illustrated, in part, in FIG. 5.

FIG. 7 illustrates a perspective view of another embodiment of a step in the method for packaging a unit of chewing gum pursuant to the present invention.

FIG. 8 illustrates a perspective view of a unit of chewing gum packaged pursuant to the method illustrated, in part, in FIG. 7.

FIG. 9 illustrates a cross-sectional view of the single unit of chewing gum of FIG. 8 taken along lines IX—IX of FIG. 8.

FIG. 10 illustrates a perspective view of another embodiment of a step in the method for packaging a unit of chewing gum pursuant to the present invention.

FIG. 11 illustrates a perspective view of a unit of chewing gum packaged pursuant to the method illustrated, in part, in FIG. 10.

FIG. 12 illustrates a cross-sectional view of the single unit of chewing gum of FIG. 11 taken along lines XII—XII of FIG. 11.

DETAILED DESCRIPTION OF THE PRESENTLY PREFERRED EMBODIMENTS

The present invention provides an improved method for packaging chewing gum products and products so packaged. Pursuant to the present invention, individual units of sugarless chewing gum can be provided to consumers with the units having a sufficiently viable shelf life. This is true even if the units are to be sold and used in environments that are very detrimental to chewing gum, especially sugarless chewing gum, such as in areas having a high humidity and/or high temperature.

Pursuant to the present invention, preferably, sugarless chewing gum pieces are enclosed in a high barrier wrapper which is then sealed. The sealed unit thereby provides a sealed environment in which the chewing gum can be stored. Due to the barrier properties of the wrapper, the housed chewing gum will have an extended shelf life even in harsh environments.

As noted above, preferably, the present invention is used with sugarless chewing gum. However, it is envisioned that the chewing gum does not have to be entirely sugarless. For example, the chewing gum may have a formulation that has a reduced sugar content as compared to other chewing gum formulations.

By way of example and not limitation, an example of a formula that can be used to prepare sugarless chewing gum is as follows:

|  | % |
| --- | --- |
| Gum Base | 24.50 |
| Sorbitol | 47.83 |
| Glycerin | 17.71 |
| Mannitol | 8.00 |
| Peppermint Flavor | 1.43 |
| Lecithin | 0.18 |
| Encapsulated Aspartame | 0.30 |
| Color Dispersion | 0.05 |
|  | 100.00 |

As previously noted, sugarless chewing gums are very susceptible to deterioration in high humidity and/or high heat environments. If placed in standard unsealed single piece wrappers, the product will deteriorate and absorb moisture quickly in a hot and/or humid environment. However, pursuant to the present invention, by individually wrapping the pieces and sealing same in a high barrier material, the chewing gum will retain freshness until consumed.

A number of high barrier wrapping materials can be used pursuant to the present invention. In an embodiment, a substrate material is provided to which a barrier material is applied. A wide variety of substrates can be used. Suitable substrates include: paper; foil; polypropylene (extruded, biaxially oriented, or cast); polyethylene (high or low density); nylon; cellophane; ethylenevinyl alcohol; and polyethylene terephthalate.

As noted above, in an embodiment, a barrier material is applied to the substrate. Again, a variety of barrier materials can be utilized. Suitable barrier materials include: aluminum; aluminum oxide; silicon dioxide; polyvinyldichloride; and other materials that provide vapor and oxygen barrier characteristics to the substrate. Such barrier materials can be affixed to the substrates by a variety of methods. Such methods include: coating; lamination; extrusion; or vacuum deposition.

Another method of creating a high barrier material is to laminate two or more layers of substrate materials together. The layers may be the same or different materials. By creating such a lamination, even substrates that alone do not provide sufficient oxygen and vapor barrier properties may become effective high barrier wrappers due to the synergistic effect of the two materials together.

In a preferred embodiment, these high barrier wrappers are used to create blanks in which the chewing gum pieces can be placed. The chewing gum pieces can then be sealed within the blanks through a variety of methods. What is important is that the chewing gum is sealed within the wrapping material.

In this regard, a number of high quality seal techniques can be used. Referring now to FIGS. 1–4, an embodiment of the method of the present invention is illustrated. Pursuant to the method, a wrapper 10 is provided. Adhesive 16 is applied, in the illustrated embodiment, along edges 18, 20, 22, and 23 of the wrapper 10. The adhesive can be a cold seal cohesive which can be applied to the edges at the time the wrapping material is manufactured. A piece of chewing gum 12 is placed within the wrapper 10. The wrapper 10 is folded along a fold line to create a side 14.

As illustrated in FIG. 2, the wrapper 10 is folded so as to cause the cohesive 16 on edge 20 to contact the cohesive on edge 23 of the wrapper 10 to create a top edge 24. Additionally, the cohesive 16 on edge portions 18a and 22a, respectively, contacts the cohesive on edge portions 18b and 22b, respectively. These surfaces are mated together through a cold sealing process under pressure to produce a sealed package. Cold sealing refers to a process wherein sealing is preformed under pressure at a temperature of less than or equal to 110° F. In the embodiment illustrated in FIG. 2, the chewing gum 12 is now sealed in the wrapper 10. The wrapper 10 is thereby sealed through a single three-sided seal.

As illustrated in FIGS. 3 and 4, if desired, the top edge 24 can be folded over to create an edge 25 and edges 18 and 22 can then be folded over so as to create edges 26 and 28, respectively. Preferably, these folds are not sealed. FIG. 4 illustrates the resultant sealed single piece of chewing gum 30.

By using a cold sealing process to seal the wrapper a number of advantages can be achieved. These advantages include faster production and a more cost effective method as compared to other possible sealing techniques.

It should be appreciated that any desired package configuration compatible with a high quality seal can be used. In this regard, three sided, four sided, fin seal, and lap sealed packages can be utilized.

As illustrated in FIGS. 5 and 6, a four sided sealed package can be provided. FIG. 5 illustrates a step in the process of creating a four sided sealed single piece of chewing gum. In this regard, a piece of chewing gum 32 is sealed between two pieces of wrapping material 34 and 36. To create the seal, each piece of wrapping material 34 and 36 includes cohesive 33 along each of four edges 38a, 40a, 42a, and 44a and 38b, 40b, 42b, and 44b, respectively. These edges are mated together and a seal is created between the edges using a cold seal process. Alternatively, a heat sealing process with appropriate adhesive or fusible substrate can be used. A resultant single piece package 45 of chewing gum is provided.

FIGS. 7–9 illustrate a single piece of chewing gum 47 sealed within a package having a fin seal. Again, a unit of chewing gum 47 is sealed within a wrapper 50. However, rather than a three or four sided seal, a fin seal 48 is used. Again, initially, a wrapper 50 that includes cohesive 55 along four edges 56, 57, 58, and 59 is provided. However, the resultant sealed package 60 includes a fin seal 48.

Other sealing techniques, besides cold sealing, can be used. For example, a heat sealing process can also be utilized in which either a hot melt, heat activated adhesive, or fusible substrate is heat sealed.

Likewise, room temperature adhesives can be utilized that can also be located at the appropriate edges of the wrapper in order to allow the product to be sealed therein. It is also possible to use an induction sealing process utilizing conductive foil systems.

FIGS. 10–12 illustrate another embodiment of the present invention. In the illustrated embodiment, a unit of chewing gum 62 is sealed within a wrapper 64 through the use of a lap seal 66. As illustrated in FIG. 10, the wrapper 64 includes adhesive 68 along three sides 69, 70, and 71. The resultant packaged product 72 includes a lap seal 66 created by edge 70 being heat sealed to another portion of the wrapper.

By way of example, and not limitation, examples of the present invention will now be given.

One method that can be utilized is a metalized oriented polypropylene film which is cold sealed using 30061A, a cohesive from Technical Coatings (360 Route 206, Flanders, N.J. 07836). The wrapper is sealed into a fin seal package.

Another method that can be utilized is using metalized polyethylene/paper laminate. This material can be sealed in a cold sealed system using the above-identified coadhesive to form a three sided package configuration.

Another method that can be utilized is a paper/polyethylene terephthalate/foil/polyethylene wrapper. The inner polyethylene layer is heat fused to itself in a fin seal or three sided configuration.

In selecting the material for the wrapper, moisture permeability is an important consideration. It is believed that the materials useful for the present invention should have a moisture vapor permeation rate of less than 0.10 g/100 in$^2$/24 hr at 100° F., 90% RH (relative humidity) as measured by ASTM method F1249-90. Preferably, the permeation rate will be less than 0.05 g/100 in$^2$/24 hr at 100° F., 90% RH as measured by ASTM method F1249-90. In a most preferred embodiment, the permeation rate will be less than 0.02 g/100 in$^2$/24 hr at the above conditions.

Another important consideration with respect to the materials for the wrapper is that they should be capable of forming a high quality reliable seal. Still further, the materials should be able to create such a seal in the preferred packaged configurations. The package material may vary depending upon aesthetic considerations as well as machinability, processability, and cost.

Another important factor in selecting the material is oxygen permeability. Preferably, the material will have an oxygen permeability of less than 0.10 cc/100 in$^2$/24 hr at one atmosphere according to ASTM method D3985-81.

In an embodiment, although the units are individually packaged, two or more units can be coupled together. This provides a method of selling two, three, or more pieces of chewing gum together.

One method for coupling the units is to place an adhesive on the wrappers. The adhesive that is chosen will couple the two pieces together, but will allow the pieces to be separated by the consumer. Another method is to provide a coupling band, elastic or non-elastic, around multiple pieces of chewing gum. Such a unit will result in reduced package weight and superior product protection as compared to conventional multi-piece packages.

A variety of chewing gum compositions can be packaged in the packaging of the present invention. A chewing gum composition generally includes a water soluble bulk portion, a water insoluble chewing gum base portion, and one or more flavoring agents. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candelilla, carnauba and polyethylene wax. If desired, a wax free base composition can also be utilized. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5–95% by weight of the chewing gum composition, more typically 10–50% by weight of the chewing gum, and most commonly 20–30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5–15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5–95% by weight of the chewing gum, more typically 20–80% by weight of the chewing gum and most commonly 30–60% by weight of the chewing gum. Bulk sweeteners may include both sugar and sugarless sweeteners and components. Sugar sweeteners may include saccharide containing components including, but not limited to, sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include, but are not limited to, sugar alcohols such as sorbitol, mannitol, xylitol, hydrogenated starch hydrolysates, maltitol, and the like, alone or in combination. Chewing gums of the present invention will use sugarless sweeteners exclusively or at least include same as a major portion of the bulk sweetener.

High intensity sweeteners may also be present and are commonly used with sugarless sweeteners. When used, high intensity sweeteners typically constitute between 0.001–5% by weight of the chewing gum, preferably between 0.01–1% by weight of the chewing gum. Typically, high intensity sweeteners are at least 20 times sweeter than sucrose. These may include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may provide additional sweetness such as with aqueous sugar or alditol solutions.

Flavor should generally be present in the chewing gum in an amount within the range of about 0.1–15% by weight of the chewing gum, preferably between about 0.25% by weight of the chewing gum, most preferably between about 0.5–3% by weight of the chewing gum. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used in the flavor ingredient of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets, scoring and cutting into pieces. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further, parts of the bulk portion may then be added to the mixer. Flavoring agents are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An enclosed single piece of substantially sugar free chewing gum comprising:

a piece of chewing gum that is substantially sugar free; and a wrapper having first and second portions surrounding the piece of chewing gum with at least the first portion of the wrapper being sealed to the second portion of the wrapper to create a sealed environment that houses the piece of chewing gum, the wrapper having a moisture vapor permeation rate of less than 0.10 g/100 in$^2$/24 hr at 100° F., 90% RH as measured by ASTM method F1249-90, and providing sufficient barrier properties to allow the single piece to be stored without a counterband packaging.

2. The enclosed single piece of claim 1 wherein the wrapper has an oxygen permeability that is less than 0.10 cc/100 in$^2$/24 hr at 1 ATM as measured by ASTM method D3985-81.

3. The enclosed single piece of claim 1 wherein the wrapper includes a substrate chosen from the group consisting of: paper; foil; polypropylene; polyethylene; nylon; cellophane; ethylenevinyl alcohol; and polyethylene terephthalate.

4. The enclosed single piece of claim 1 wherein the wrapper includes a substrate having a barrier layer including a material chosen from the group consisting of: aluminum; aluminum oxides; silicon dioxide; and polyvinyldichloride.

5. The enclosed single piece of claim 4 wherein the barrier layer is created by applying the material to the substrate using a method chosen from the group consisting of: coating; lamination; extrusion; and vacuum deposition.

6. The enclosed single piece of claim 1 wherein the chewing gum is sugar free.

7. The enclosed single piece of claim 1 wherein the first portion of the wrapper is sealed to the second portion of the wrapper through a cold sealing process.

8. The enclosed single piece of claim 1 wherein the first portion of the wrapper is sealed to the second portion of the wrapper through a heat sealing process.

9. The enclosed single piece of claim 1 wherein the first portion of the wrapper is sealed to the second portion of the wrapper through use of an adhesive.

10. The enclosed single piece of claim 1 wherein the first portion of the wrapper is sealed to the second portion of the wrapper through an induction sealing process.

11. An enclosed single piece of substantially sugar free chewing gum comprising:

a piece of chewing gum that is substantially sugar free; and a wrapper having first and second portions surrounding the piece of chewing gum with at least the first portion of the wrapper being sealed to the second portion of the wrapper, the wrapper providing sufficient barrier properties to allow the single piece to be stored without being packaged in a counterband packaging and the wrapper being defined by a substrate including at least one material selected from the group consisting of: foil; polypropylene; polyethylene; nylon; cellophane; ethylenevinyl alcohol; and polyethylene; and a barrier layer of at least one material selected from the group consisting of aluminum; aluminum oxides; silicon dioxide; and polyvinyldichloride.

12. The enclosed single piece of claim 11 wherein the high barrier wrapper has a moisture vapor permeation rate of less than 0.10 g/100 in$^2$/24 hr at 100° F., 90% RH as measured by ASTM method F1249-90.

13. The enclosed single piece of claim 11 wherein the wrapper has an oxygen permeability that is less than 0.10 cc/100 in$^2$/24 hr at 1 ATM as measured by ASTM method D3985-81.

14. The enclosed single piece of claim 11 wherein the chewing gum is sugar free.

15. The enclosed single piece of claim 11 including means for coupling a first enclosed single piece to a second enclosed single piece.

16. The enclosed single piece of claim 15 wherein the means includes an adhesive located on an outer surface of the high barrier wrapper.

17. A method for packaging a substantially sugar free piece of chewing gum comprising the steps of:

providing a wrapper having a vapor permeation rate of less than 0.10 g/100 in$^2$/24 hr at 100° F., 90% RH as measured by ASTM method F1249-90 and an oxygen permeability that is less than 0.10 cc/100 in$^2$/24 hr at 1 ATM as measured by ASTM method D3985-81; and sealing a substantially sugar free piece of chewing gum within the wrapper and not placing the sealed chewing gum in a counterband wrapper.

18. The method of claim 17 wherein the piece of chewing gum is sealed within the wrapper by cold sealing at least a first portion of the wrapper to a second portion of the wrapper.

19. The method of claim 17 wherein the piece of chewing gum is sugar free.

20. The method of claim 17 including the step of coupling the piece of packaged chewing gum to a second piece of packaged chewing gum.

21. The method of claim 17 wherein the wrapper is sealed by a three sided seal.

22. The method of claim 17 wherein the wrapper is sealed by a four sided seal.

23. The method of claim 17 wherein the wrapper is sealed by a fin seal.

24. The method of claim 17 wherein the wrapper is sealed by a lap seal.

* * * * *